United States Patent [19]

Uchiyama

[11] Patent Number: 5,423,210
[45] Date of Patent: Jun. 13, 1995

[54] AIR FLOW RATE METER AND AIR FLOW RATE DETECTION

[75] Inventor: Kaoru Uchiyama, Oomiya, Japan

[73] Assignee: Hitachi, Ltd., Japan

[21] Appl. No.: 123,100

[22] Filed: Sep. 20, 1993

[30] Foreign Application Priority Data

Sep. 18, 1992 [JP] Japan .................. 4-249484

[51] Int. Cl.$^6$ .............................. G01F 1/68
[52] U.S. Cl. ................... 73/204.15
[58] Field of Search ........... 73/204.15, 204.16, 204.18,
73/204.19, 118.2; 123/494, 417, 48

[56] References Cited

U.S. PATENT DOCUMENTS

| | | | |
|---|---|---|---|
| 4,587,842 | 5/1986 | Handtmann | 73/204.14 |
| 4,682,496 | 7/1987 | Miura et al. | 73/204.23 |
| 4,870,935 | 10/1989 | Araki | 123/417 |
| 4,991,560 | 2/1991 | Asai et al. | 73/118.2 |

FOREIGN PATENT DOCUMENTS 63-134919 6/1988 Japan .

OTHER PUBLICATIONS

"Hot Film Air Mass Meter—A Low-Cost Approach to Intake Air Measurement", R. Sauer, Robert Bosch GmbH, pp. 105–108.

Primary Examiner—Richard E. Chilcot, Jr.
Assistant Examiner—Harshad Patel
Attorney, Agent, or Firm—Evenson, McKeown, Edwards & Lenahan

[57] ABSTRACT

An air flow rate meter and air flow rate detection method in which the air flow rate detector has both a heat generating temperature sensing resistor and a secondary heating resistor to generate heat in an air passage. A separate current source provides heating current to the secondary heating resistor in order to maintain the operating temperature of the air flow detector in the proper range, which is higher than the ambient air temperature 13 Claims, 7 Drawing Sheets

AIR FLOW RATE METER AND AIR FLOW RATE DETECTION

BACKGROUND OF THE INVENTION

The present invention relates to an air flow rate meter. More particularly, it concerns a thermal air flow rate meter for use in controlling an engine of an automobile.

In order to protect the natural environment and save resources, it is most important to decrease the harmful exhaust gas emissions of automobile engines, and to increase their fuel efficiency. For this purpose, it is essential to control the engine fuel supply and ignition precisely. To accomplish this objective, an electronic fuel injection system tends to be used most frequently. For such systems, it is particularly important that accurate information concerning the air flow rate to the engine be available. Thermal air flow rate meters are often provided to satisfy this need. The demand placed on the automobile's electric power system by such electronic systems, however, is significant, and can adversely affect its operation. Thus, it is important to decrease the overall electric power demand of such systems wherever possible. In, particular, one of the problems associated with thermal air flow rate meters is to find a way to reduce the very high voltage needed to operate them.

One important measure to lower the operating voltage of a thermal air flow rate meter is to lower the power used for heating a heat generating resistor when the air flow rate is null. To accomplish this, Japanese patent Laid-Open No. 134919 of 1988 discloses an indirect heating arrangement having a heating resistor which is used to heat a thermally variable resistor. Although such indirect heating systems can lower the operating power consumption, their response to changes of air flow is slowed by the time required for the flow of heat from the heating resistor to the heat generating resistor, especially because the output signal is taken from the heating resistor. Also, the contact resistance of the connectors to external equipment, or the input unit, causes some error in air flow rate detection in the input unit, because the output signal is a voltage. Such problems indirectly mean that the operating power is too high.

In view of the foregoing, it is an object of the present invention to provide an air flow rate meter and air flow rate detection method capable of detecting an air flow at high accuracy, even at lower operating voltage.

SUMMARY OF THE INVENTION

Briefly, the foregoing object is accomplished according to the present invention by an air flow rate meter and air flow rate detection method in which the air flow rate detector has both a heat generating temperature sensing resistor and a secondary heating resistor to generate heat therein. A separate current source provides heating current to the secondary heating resistor in order to maintain the operating temperature of the air flow detector in the proper range, which is higher than the ambient air temperature. The heat generating temperature sensing resistor forms a bridge circuit with an air temperature detecting resistance to feed back a heat generating current in a known manner, so that the temperature of the heat generating resistor can be constant for a particular air flow rate. This operation allows the air flow rate meter to operate at a low voltage. It also makes the response quicker, as the heat generating resistor feeds the current out.

The heating current flowing through the heat generating temperature sensing resistor, which is indicative of the air flow rate Q, is output through a current mirror circuit. Further, provision is made to adjust the external current to the heating resistor, as well as the characteristic of the current mirror circuit, in response to changes in ambient temperature. This enables the sensor according to the invention to obtain a desired output current characteristic relative to the air flow rate. At the same time, it can compensate for changes of the temperature at the air flow rate detector to prevent a drift of the output signal due thereto.

Other objects, advantages and novel features of the present invention will become apparent from the following detailed description of the invention when considered in conjunction with the accompanying drawings.

DETAILED DESCRIPTION OF THE DRAWINGS

Figure 1:
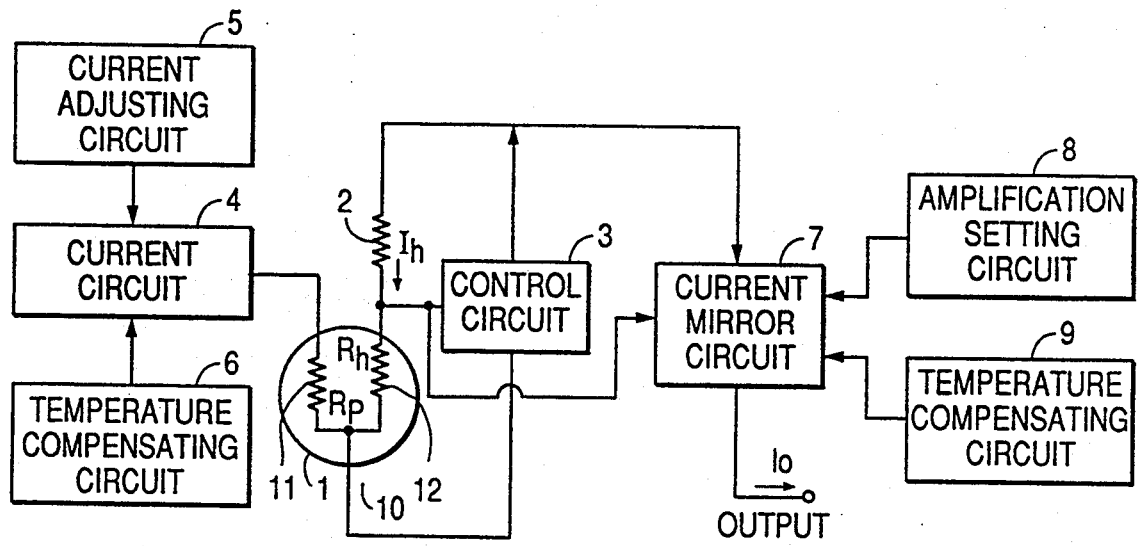
FIG. 1 is a block diagram of the present invention.

In FIG. 1, an air flow rate detector 1 has both a heat generating temperature detecting resistor 12 (a so-called "hot wire" detector) and a secondary heating resistor 11 (whose function is explained below) arranged in an air flow path 10. A control unit 3 detects and controls the temperature of an air flow rate detector 1 by controlling the heating current $I_h$ which flows through the resistor 12. A resistor 2 is provided to detect the heating current $I_h$, which is a measure of the air flow across the sensor 1.

In FIG. 1 also is indicated a current circuit 4 which feeds a current to the secondary heating resistor 11 as described hereinafter. The current circuit 4 is connected with a current adjusting circuit 5 for adjusting the current, and with a temperature compensating circuit 6 for adding a temperature dependent component to the current.

Figure 3:
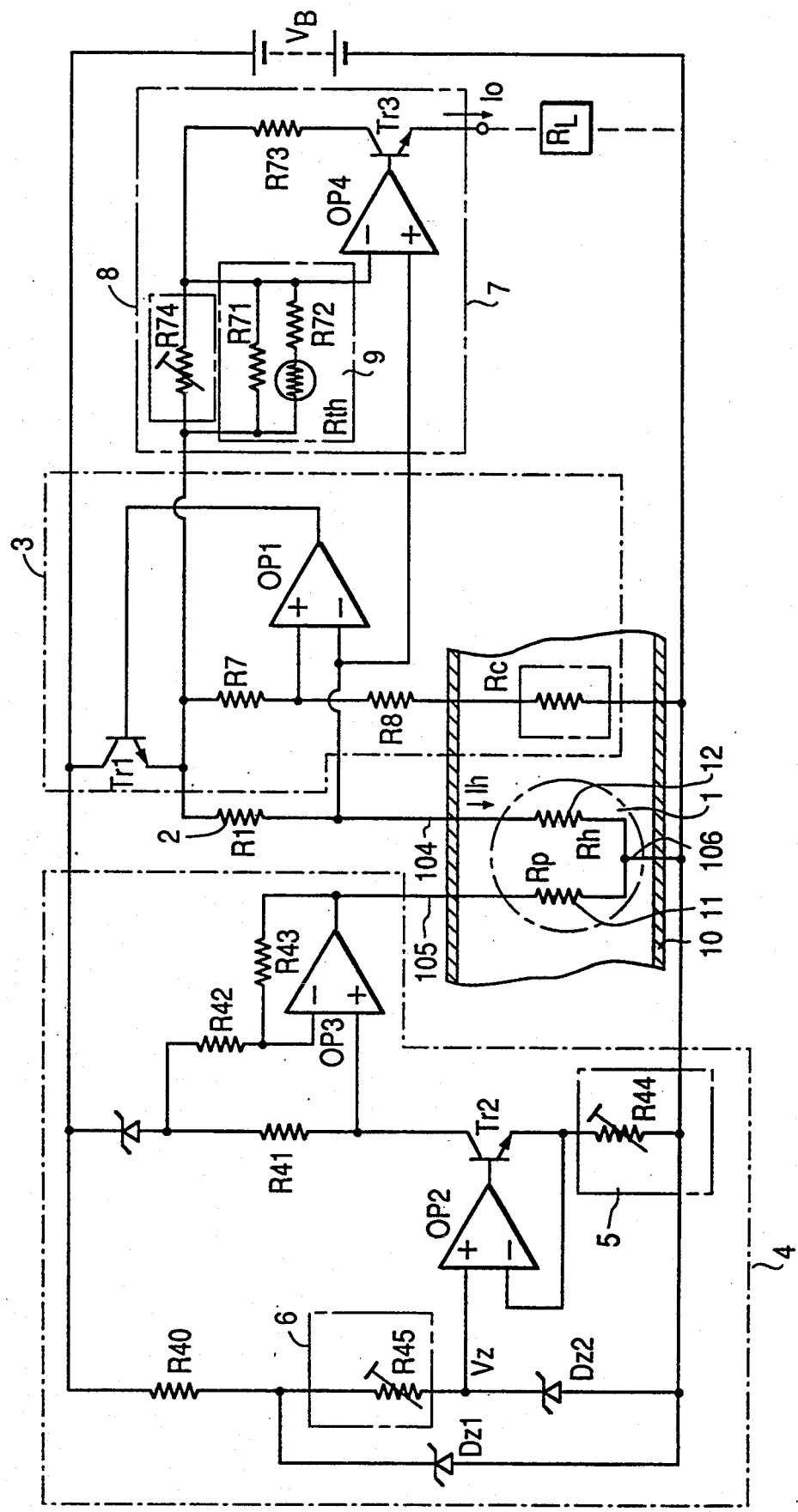
FIG. 3 is a detailed circuit diagram of the air flow rate meter according to the invention.

As shown in greater detail in FIG. 3, the control circuit 3 has a heat sensing resistor $R_c$ (a so-called "cold wire" sensor) arranged in the air flowpath 10 with the air flow rate detector 1, to detect the temperature of the air flow that is to be measured. The heat generating temperature sensing resistor 12, the resistor 2 (resistance R₁), the heat sensing resistor $R_c$, and resistors $R_7$ and $R_8$ form a bridge circuit, to which operational amplifier OP₁ feeds the heat generating current $I_h$ through a transistor Tr1. With this arrangement, if the air flow across the heat generating temperature sensing resistor 12 increases, its temperature (and therefore its resistance) decreases, causing an imbalance of the bridge circuit. This causes the operational amplifier OP₁ to increase the heating current $I_h$ until the temperature of the resistor 12 rises to its previous level. Thus, the magnitude of the heating current $I_h$ is a measure of the quantity of air flow through the detector.

The heat generating current $I_h$ is converted to an output current $I_o$ by a current mirror circuit 7. That is, an operational amplifier OP₄ and a transistor in FIG. 3 obtain the output current given in Equation 1.

$$I_o = \frac{R_1}{R_x} I_h \quad \text{[Equation 1]}$$

where $R_x$ is composite resistance of resistors $R_{71}$, $R_{72}$, and $R_{74}$ and a thermistor $R_{th}$. The composite resistance $R_x$ can adjust both the amplification and temperature response of the current mirror circuit 7. That is, the variable resistor $R_{74}$ of an amplification setting circuit 8 sets the amplification $R_1/R_x$ of the current mirror circuit, and the resistance of the thermistor $R_{th}$ Of a temperature compensating circuit 9 can adjust its temperature response.

Heating power consumption (the quantity of heat dissipated by the heat wire) in a thermal air flow meter of the direct heating type described above is given by Equation 2 below, and the heating current can be calculated by Equation 3:

$$I_h^2 R_h = (A + B\sqrt{Q})(T_h - T_a) \quad \text{[Equation 2]}$$

$$I_h = \left\{ \frac{1}{R_h} (A + B\sqrt{Q})(T_h - T_a) \right\}^{\frac{1}{2}} \quad \text{[Equation 3]}$$

where $I_h$ is the heating current, $R_h$ is the resistance of the heat generating temperature sensing resistor 12, $T_h$ is the temperature of the heat generating temperature sensing resistor, $T_a$ is the air temperature, and Q is the air flow rate.

Figure 2:
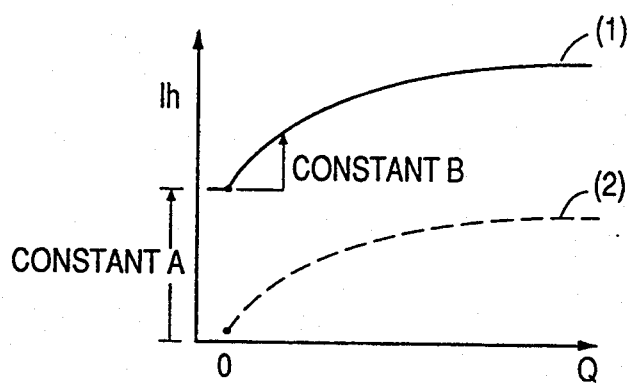
FIG. 2 shows characteristic curves of a thermal air flow rate meter.

The heating current $I_h$ as a function of air flow rate Q calculated according to Equation 3 is shown by the curve (1) in FIG. 2. It is apparent from this graphic depiction that for a particular air temperature the heating current (and hence the voltage) necessary to maintain such an air flow detector in the proper operating mode comprises two components: a fixed component attributable to the constant A (which component depends only on the air temperature), and a variable component which varies with the air flow rate (curve 1). Thus, even when the air flow rate is zero, a heating current $I_{ha} = \{A/R_h (T_h - T_a)\}^{\frac{1}{2}}$ is required to operate the bridge circuit of FIG. 3, due to the difference between $T_h$ and $T_a$. That is the heating current $I_{ha} = \{A/R_h(T_h - T_a)\}^{\frac{1}{2}}$ of the direct heating resistor at the air flow rate of 0 determines the lowest operating voltage $I_{ha} \times R_h$.

In the air flow rate detector according to the invention, the overall voltage required to operate the bridge circuit as discussed above is reduced by providing a separate current source 4 for the fixed heating current component, so that the bridge operating voltage in the control circuit 3 is determined only by the term $B\sqrt{Q}$ in the equation 3. That is, the heat necessary to maintain the air flow rate detector in the proper operating temperature range is provided by the separate secondary heating resistor $R_p$, which is provided with current by the separate circuit 4. The bridge operating voltage, thus, is as low a voltage as curve (2) in FIG. 2.

The heat constants A and B in Equation 3 reflect heat dissipation, and vary with temperature. In the present invention, the heat constants can be adjusted to those at room temperature by the current adjusting circuit 5 and the temperature compensating circuit 6 so that the air flow rate detection signal can be obtained at a high accuracy over a wide range of temperatures.

As shown in FIG. 3, a zener diode $D_{z2}$ in the current circuit 4 sets a zener voltage $V_z$. An operational amplifier OP₂ and a transistor Tr₂ cause a current $V_z/R_{44}$ to flow in the variable resistor $R_{44}$ in the current adjusting circuit 5. A current mirror circuit OP3 feeds a heating current of $(V_z/R44) \times (R_{41}/R_{42})$ to the heating resistor 11. The temperature response of the heating current can be varied in the same manner that the zener current of the zener diode $D_{z2}$ is adjusted with a resistor $R_{45}$, to change the zener voltage $V_2$ with temperature. In other words, the temperature change of the heating current can be set to a desired rate by adjusting the resistor $R_{45}$ of the temperature compensating circuit 6.

Figure 4A:
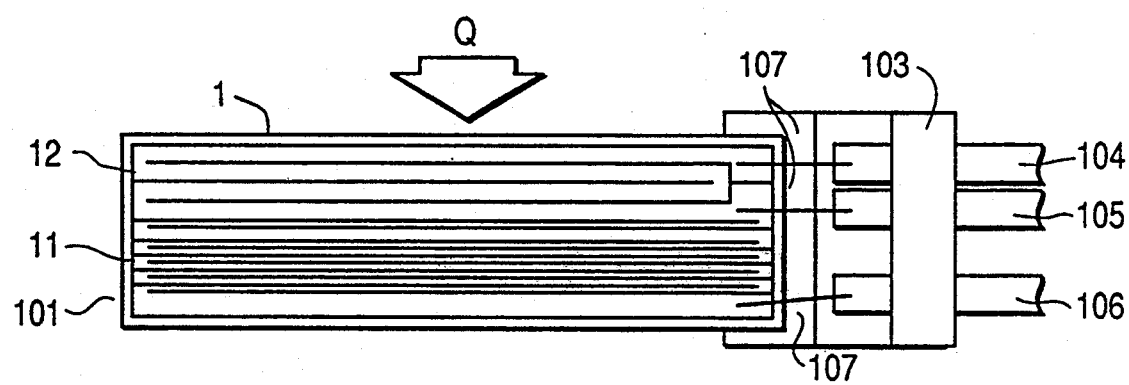
FIGS. 4A and 4B are a plan view and a cross section, respectively, of an air flow rate detector according to the invention.
Figure 4B:
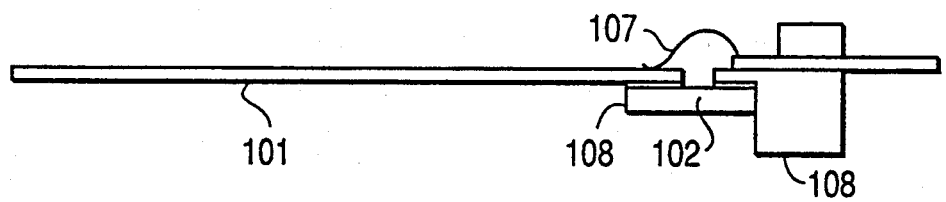

The construction details of the air flow rate detector according to the invention are shown in FIGS. 4A and 4B. A base plate 101 is made of ceramic or glass, and has the secondary heating resistor 11 and the heat generating temperature sensing resistor 12 formed as film resistances on the surface thereof. These resistances are made of materials having a high temperature coefficient, such as platinum or nickel. The base plate 101 is fixed on a base 102, made of a material which has a low heat conduction (such as glass), with bond 108. The base 102 is attached to a holder 103 having terminals 104 to 106, which are electrically connected with the resistors by a wire bonding 107. The holder 103 is inserted in the air flow path (not shown).

Figure 5:
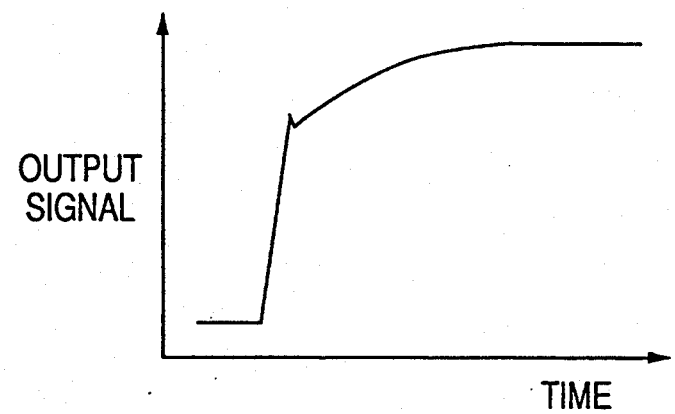
FIG. 5 shows a response curve of the air flow rate detector of FIG. 4.

The structure described above provides a response curve shown in FIG. 5. As can be seen from the curve, the response is quick up to a certain point, because the control circuit 3 feeds an abrupt heat generating current to the heat generating resistor as the air flow rate increases with a wide cross-sectional area between the secondary heating resistor 11 and the heat generating temperature sensing resistor 12. Thereafter, however, the response becomes slow because a large amount of heat is transferred between the secondary heating resistor 11 and the heat generating resistor temperature sensing 12.

Figure 6A:
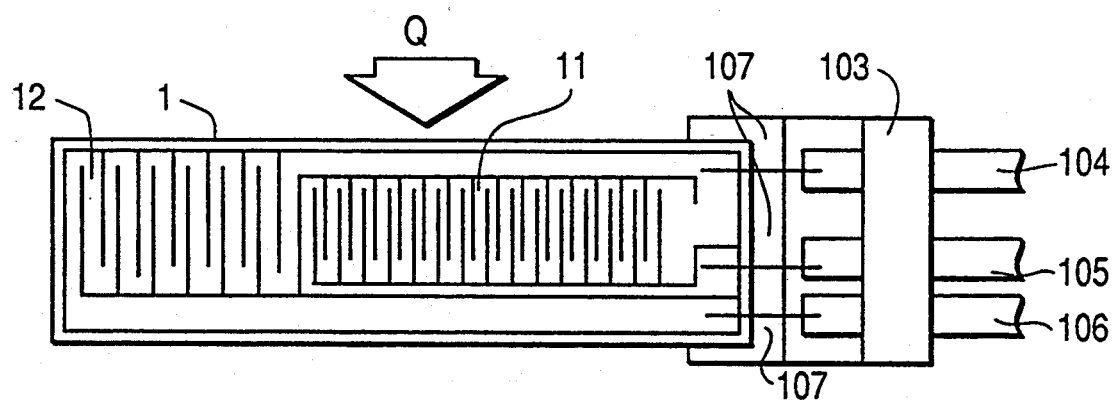
FIG. 6 is an improved structure of the air flow rate detector according to the invention.
Figure 6B:
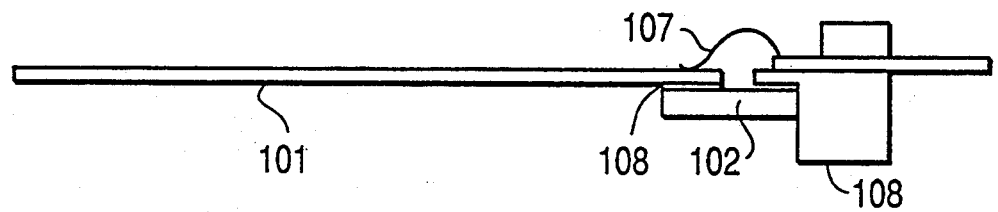
Figure 7:
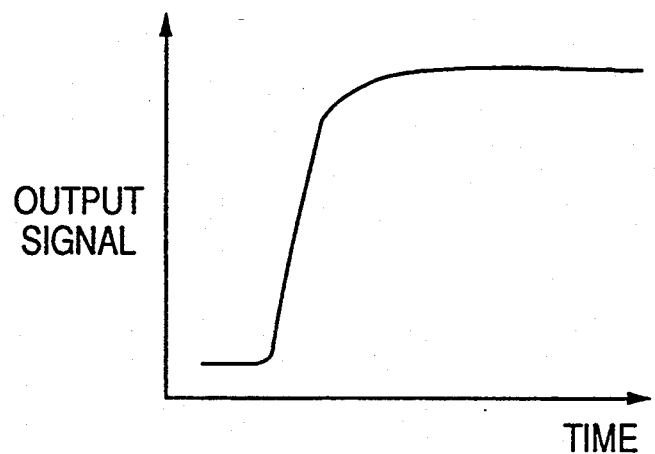
FIG. 7 shows a response curve for the air flow rate detector of FIG. 6.

FIG. 6 is an improved embodiment of the air flow rate detector 1. In FIG. 6, the secondary heating resistor 11 is formed on the end of the base plate 101 supported by the base 102, and the heat generating temperature sensing-resistor 12 is mounted on the opposite end. This arrangement minimizes the heat transfer, during operation of the heat sensor, between the secondary heating resistor 11 and the heat generating temperature sensing resistor 12, because the cross-sectional area between them is narrower. This arrangement also reduces the direct transfer of heat from the heat generating temperature sensing resistor 12 to the base 102, since the heat constant A in Equations 2 and 3 conducted to the base 102 is heated by the secondary heating resistor 11. For this reason, the response of this arrangement is faster, as shown in FIG. 7.

Figure 8A:
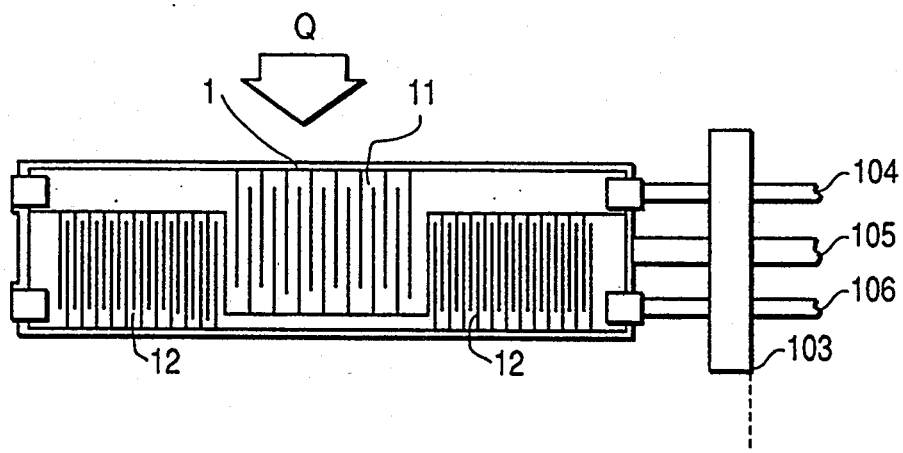
FIGS. 8A, 8B and 8C show another embodiment of the air flow rate detector according to the invention.
Figure 8B:
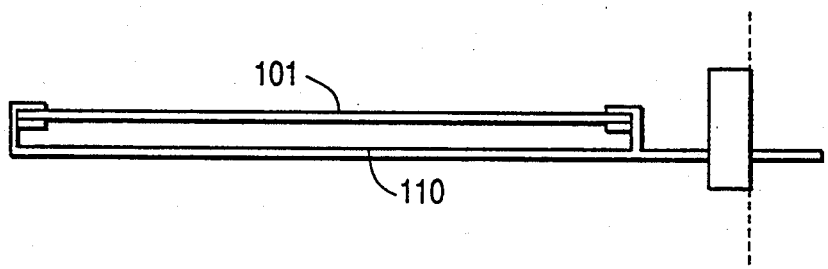
Figure 8C:
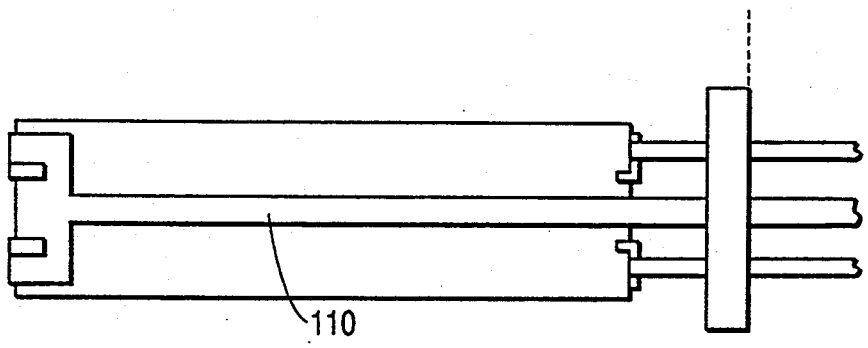

FIG. 8 shows yet another embodiment of the air flow rate detector 1 in which the base plate 101 has a different supporting structure. FIGS. 8A, B and C are a top view, a side view and a bottom view, respectively. In this embodiment, the heat generating temperature sensing resistor 12 is divided in two and mounted on both ends of the base plate 101, with the secondary heating resistor 11 mounted in the middle. The heat generating temperature sensing resistor 12 is electrically connected with the external circuits, such as the control circuit 3, through thin plate leads 110, 104, 105, and 106. The holder 103 is held in the air flow path 10. In this arrangement, the leads 110, 104, 105, and 106 can be changed in length so that the air flow rate detector can be placed at a desired position in the air flow path 10. The arrangement also can obtain a quicker response signal.

Figure 9:
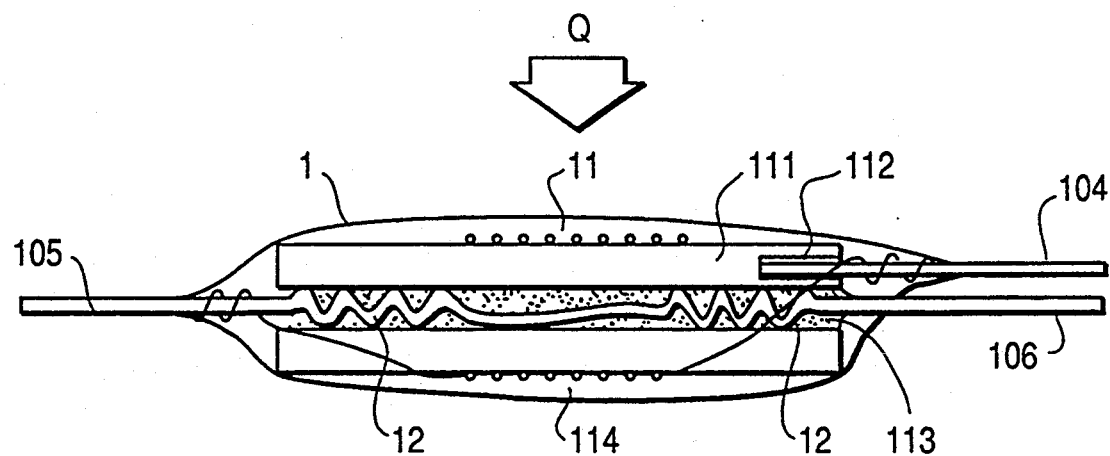
FIG. 9 is still another embodiment of the air flow rate detector according to the invention.

FIG. 9 is still another embodiment in which a bobbin is used to form the air flow rate detector. The hollow bobbin 111 is formed of ceramic or glass and has the heat generating temperature sensing resistor 12 positioned in the hollow center at both ends thereof, held in place by a bonding material 113. The resistor 12 has leads 105 and 106 extended from terminals thereof. The secondary heating resistor 11, made of platinum wire, is wound around the center of the hollow bobbin 111, and has an end welded with the lead 105. The other end is connected with the lead 104, which is held in place by a bonding material 112 (for example, glass). A glass layer 114 holds the secondary heating resistor 11 in position. The arrangement described above provides a quicker response than the preceding one.

Figure 10:
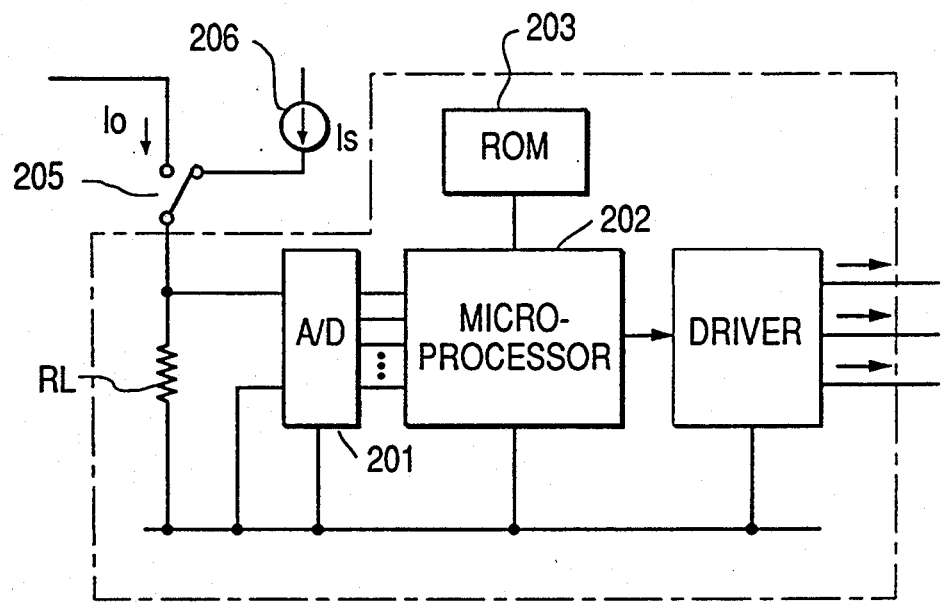
FIG. 10 is a block diagram of an embodiment of an input unit of the present invention.

FIG. 10 is a block diagram of an embodiment of an input unit of the present invention. The reference resistor $R_L$ converts an air flow rate signal $I_o$ to a voltage, which is digitized by an A/D converter 201, and input to a microprocessor 202. In such an input unit, any loss of accuracy in the air flow rate signal is due mostly to variations due to manufacturing tolerances of the reference resistor $R_L$. In the present invention, when the input unit is manufactured, a reference current $I_s$ is passed through the reference resistor $R_L$, and a difference between the resulting voltage across it and a standard value is stored in the ROM 203. In routine air flow rate detection, the microprocessor 202 compensates for the difference based on the information stored in the ROM 203 to cancel the effect of tolerances in the reference resistor $R_L$. This arrangement permits a highly accurate reading of the output current signal. Note that a switch 205 indicated in the figure is included for easy understanding of the description, but is not related to the essence of the present invention.

Figure 11:
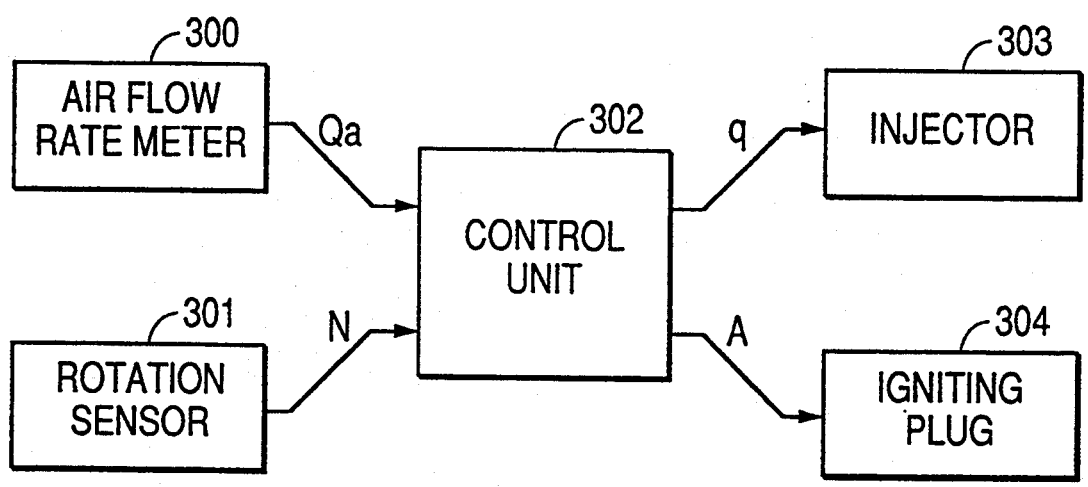
FIG. 11 is a block diagram of an engine control system.

FIG. 11 is a block diagram for an engine control system having the above-described air flow rate meter and the input provided therein. Outputs from the air flow meter 300 of the present invention and a rotation sensor 301 for detecting a rotational frequency of an engine, are input to a control unit 302 which has an input unit of the type shown in FIG. 10, and a microcomputer provided therein. The control unit 302 gives commands, including an air flow rate signal $Q_a$, and optimum fuel quantity q calculated in terms of an engine rotation signal N, and an optimum igniting instance A, to the fuel injector 303 and the ignition plug 304 to control the engine. This arrangement provides an engine control system which can operate at high accuracy.

The air flow meter of the present invention can operate at low voltage and respond quickly to changes of air flow rate, with high detection accuracy in a wide temperature range. Characteristic adjustment and temperature compensation can be achieved without being affected by any contact resistance of the connection terminals. The present invention also maintains high accuracy despite heat dissipation of the reference resistance in the system.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Air flow meter comprising:
   a heat generating temperature sensing resistor arranged in an air flow path, said heat generating temperatures sensing resistor comprising a heat generating resistor having a resistance which varies with temperature thereof;
   a first current source for providing a first heating current to said heat generating temperature sensing resistor;
   means for controlling said first heating current to maintain a temperature of said heat generating temperature sensing resistor at a predetermined variable target temperature value;
   means for detecting magnitude of said first heating current;
   a secondary heating element arranged in said air flow path with said heating generating temperature sensing resistor;
   a secondary current source coupled to supply a secondary heating current to said secondary heating element;
   wherein said means for controlling said first heating current comprises:
      an air temperature sensing resistor which forms a bridge circuit with said heat generating temperature sensing resistor; and
      means for controlling said first current source in response to an output from said air temperature sensing element.

2. Air flow meter according to claim 1, wherein said means for controlling said first current source comprises an operational amplifier having a first input coupled to said air temperature sensing resistor and a second input coupled to said heat generating temperature sensing resistor and having an output coupled to control a controlling element for said heating current.

3. Air flew meter comprising:
   a heat generating temperature sensing resistor arranged in an air flow path, said heat generating temperature sensing resistor comprising a heat generating resistor having a resistance which varies with temperature thereof;
   a first current source for providing a first heating current to said heat generating temperature sensing resistor;
   means for controlling said first heating current to maintain a temperature of said heat generating temperature sensing resistor at, a predetermined variable target temperature value;

means for detecting magnitude of said first heating current;

a secondary heating element arranged in said air flow path with said heat generating temperature sensing resistor;

a secondary current source coupled to supply a secondary heating current to said secondary heating element;

wherein said secondary current source comprises means for adjusting a response to said secondary heating current to changes in ambient air temperature; and wherein said means for adjusting a response of said secondary heating current comprises a zener diode coupled to a variable resistor.

4. Air flow meter according to claim 3, wherein said secondary current source controls said secondary heating current to a value which maintains temperature of said heat generating temperature sensing resistor at said target temperature with an air flow rate substantially equal to zero in said air flow path.

5. In an air flow rate sensor of the type having a heat generating temperature sensing resistor arranged in a bridge circuit with an air temperature sensing resistor, said heat generating temperature sensing resistor and said air temperature sensing resistor being mounted in an air flow path through which air flow is to be measured, wherein a difference in voltage between said heat generating temperature sensing resistor and said air temperature sensing resistor is used to control a heating current supplied to said heat generating temperature sensing resistor, an arrangement for reducing magnitude of said heating current comprising:

a secondary heating element arrangement in said air flow path whereby said secondary heating element heats air passing through said air path;

a secondary current source coupled to supply a secondary heating current to said secondary heating element;

wherein said secondary current source comprises means for adjusting a response of said secondary heating current to changes in ambient air temperature; and wherein said means for adjusting a response of said secondary heating current comprises a zener diode coupled to a variable resistor.

6. Air flow meter according to claim 5, wherein said secondary current source controls said secondary heating current to a value which maintains temperature of said heat generating temperature sensing resistor at a target temperature, with an air flow rate substantially at a target temperature, with an air flow rate substantially equal to zero in said air flow path.

7. Method of detecting an air flow rate by means of an air flow rate meter of the type having a heat generating temperature sensing resistor arranged in an air flow path; a first current source for providing a first heating current to said heat generating temperature sensing resistor; a control unit for controlling said first heating current to maintain a temperature of said heat generating temperature sensing resistor at a predetermined variable target temperature; and means for detecting magnitude of said first heating current; said method comprising the steps of:

providing a secondary heating element in said air flow path;

passing a secondary heating current through said secondary heating element, said secondary heating current having a magnitude sufficient to heat air in said air flow to an air flow rate of zero.

8. Method according to claim 7, comprising the additional step of:

adjusting said secondary heating current in responses to changes in ambient air temperature.

9. Method of measuring an air flow rate in an air passage comprising the steps of:

heating air in said air passage by means of a heat generating temperature sensing resistor and a secondary heating resistor;

providing a secondary heating current to said secondary heating resistor having a magnitude suffice to heat said air in said air passage to a predetermined variable target temperature at an air flow rate of zero;

providing a primary heating current to said heat generating temperature sensing resistor, said primary heating current having a variable magnitude which maintains temperature of air in said air passage at said target temperature in the presence of an air flow in said air passage; and measuring magnitude of said primary heating current.

10. Method according to claim 9, wherein said step of providing a secondary heating current comprises a further step of adjusting said secondary heating current in responses to changes in ambient air temperature.

11. Apparatus for controlling an internal combustion engine having:

an engine speed sensor;

an air flow rate meter for measuring a rate of intake air flow to said internal combustion engine; and a microprocessor for controlling fuel supply to a fuel injection system of said engine and ignition timing of said engine in response to output signals from said air flow rate meter and said engine speed sensor;

wherein said air flow rate meter comprises:

a heat generating temperature sensing resistor arranged in an air flow path, said heat generating temperature sensing resistor comprising a heat generating resistor having a resistance which varies with temperature thereof;

a first current source for providing a first heating current to said heat generating temperature sensing resistor;

means for controlling said first heating current to maintain a temperature of said heat generating temperature sensing resistor at a predetermined variable target temperature value;

means for detecting magnitude of said first heating current;

a secondary heating element arranged in said air flow path with said heat generating temperature sensing resistor;

a secondary current source coupled to supply a secondary heating current to said secondary heating element;

wherein said secondary current source comprises means for adjusting a response of said secondary heating current to changes in ambient air temperature; and wherein said means for adjusting a response of said secondary heating current comprises a zener diode coupled to a variable resistor.

12. Air flow meter according to claim 11, wherein said secondary current source controls said secondary heating current to a value which maintains temperature of said heat generating temperature sensing resistor at said target temperature, with an air flow rate substantially equal to zero in said air flow path.

13. Apparatus according to claim 11, wherein said microprocessor has a current sensing interface circuit comprising:
- an output resistor coupled to receive said first heating current;
- a sensor for detecting a value of a voltage across said output resistor;
- an analog to digital converter for digitizing said value;
- a microprocessor coupled to receive said digitized value; and
- a memory accessible by said microprocessor, said memory containing digitized correction information corresponding to a difference between a value of voltage across said resistor when a reference current is passed through it, and a standard voltage value;
- said microprocessor having means for adjusting said digitized values in response to said digitized correction information contained in said memory.

* * * * *